H. OGBORN.
Straw Cutter.
No. 62,674.
Patented March 5, 1867.
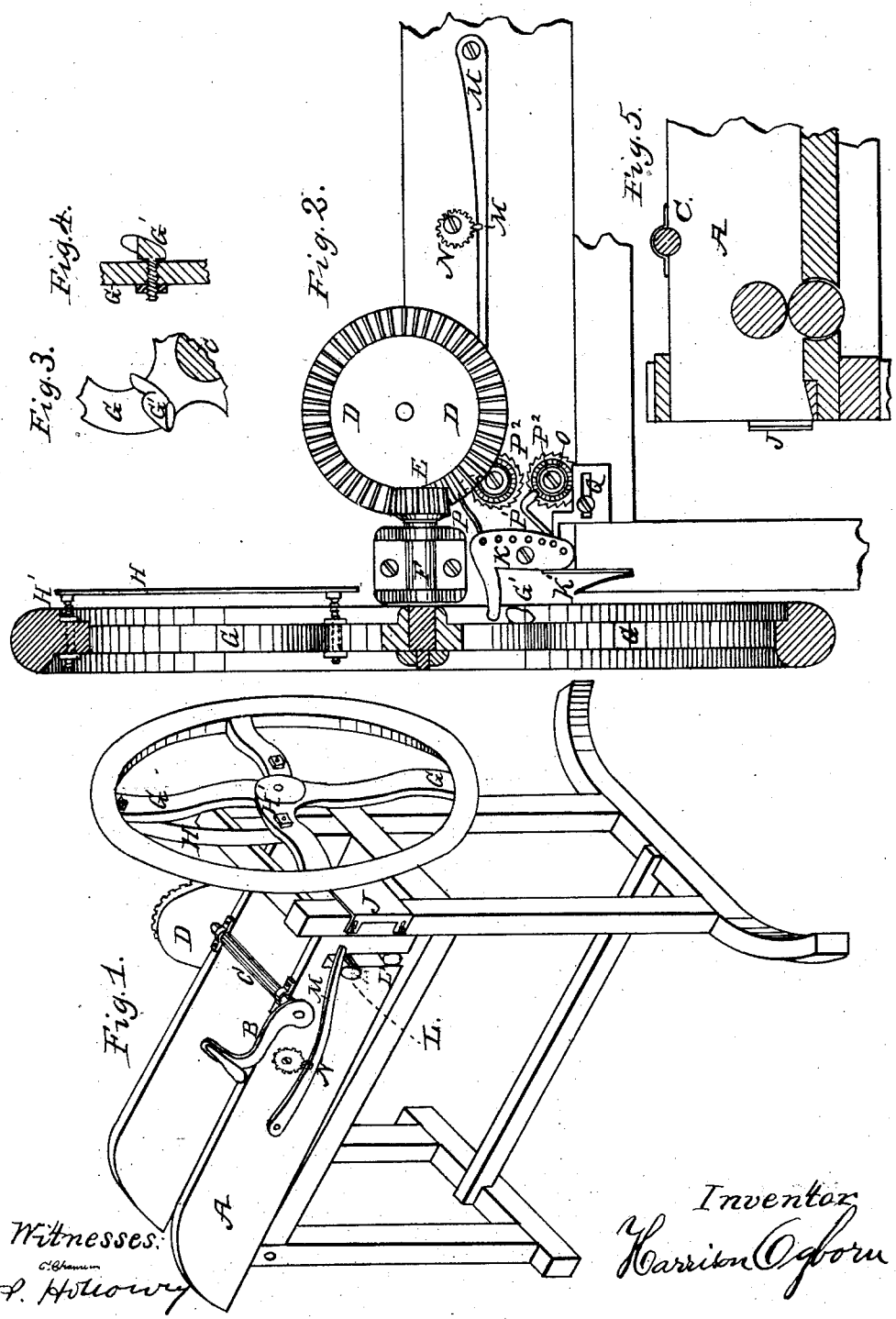

United States Patent Office.

HARRISON OGBORN, OF RICHMOND, INDIANA, ASSIGNOR TO HIMSELF AND JOHN W. FREE, OF THE SAME PLACE.

Letters Patent No. 62,674, dated March 5, 1867.

---

IMPROVEMENT IN STRAW CUTTERS.

---

The Schedule referred to in these Letters Patent and making part of the same.

---

TO ALL WHOM IT MAY CONCERN:

Be it known that I, HARRISON OGBORN, of Richmond, in the county of Wayne, and State of Indiana, have invented new and useful Improvements in Straw and Fodder Cutters; and I do hereby declare that the following is a full, clear, and exact description of the same, reference being had to the annexed drawings, made part of this specification, in which—

Figure 1 is a perspective view.
Figure 2 is a side elevation.
Figure 3, an elevation showing the cam on the fly-wheel
Figure 4, a section of the same; and
Figure 5 is a central longitudinal vertical section.

The same letters are employed in all the figures for the indication of identical parts.

A is the frame and cutting-box; B the driving-crank, which turns the shaft C, crossing the cutting-box, and carrying the overhung bevel-wheel D, which drives the bevel-pinion E on the end of the shaft F of the fly-wheel G. The knife H is attached to the arms of the fly-wheel G by bolts, H', having nuts upon each side of the fly-wheel, holding the knife securely, and permitting its adjustment. The knife is attached to the fly-wheel, with the end that first begins to cut nearer the centre than the other, so as to give a shearing cut. The plate J is adjustably attached to the frame by set-screws passing through slots in the plate and into the sides of the frame. This plate is bent at right angles, passing across the end of the frame to a point beyond the end of the knife, which projects beyond its point of attachment. This adjustable plate prevents the knife from being thrown away from the edge of the cutting-box by the straw or other material subjected to its action. The edge of the box is formed by a plate, having a downward inclination towards the edge, in connection with which the knife acts. This inclination is given for the purpose of allowing the straw to bend slightly, so that the knife may act thereon slightly diagonally. The bottom of the box is level.

The straw or other material to be cut is fed between the two rollers L and L'. The lower roller L' turns upon fixed bearings, while the upper roller L has a free vertical play, its journals passing through slots in the sides of the cutting-box, and is pressed upon the top of the straw or other material by the tension of the springs, which rest upon the journals outside the cutting-box. The degree of pressure given by the springs is regulated by the eccentric cams N, which are notched upon their edges, the notches fitting the projection M' on the springs, so that the cams cannot turn by the shaking of the machine when in operation. O and O' are ratchets, upon the ends of the journals of the rollers L and L', the notches on which are in different directions, so that the upper roller shall turn under, and the lower one over towards the mouth of the cutting-box, with the action of the feed hands P and P¹. These feed hands are attached respectively to the upper and lower ends of the bell-crank K, which is pivoted to the side of the frame. The feed hand P, resting upon the ratchet O, pushes it with the movement of the feed hand, and upper part of the bell-crank, away from the fly-wheel. The feed hand P¹ rests upon the top of the ratchet O', and, hooking over the teeth, draws the ratchet, with the motion of the feed hand and lower end of the bell-crank, towards the fly-wheel. The feed mechanism is actuated by a cam, G', attached to one of the arms of the fly-wheel opposite to that to which the knife is attached, nearest the centre, so that the feed motion shall be given when the knife is not in action. This cam is attached to the fly-wheel by a screw, cut on its stem, and having a jam-nut on the end, on the opposite side of the fly-wheel, by which means the amount of feed may be regulated by giving more or less motion to the shank of the bell-crank. This cam has two faces, so that it may act upon the bell-crank when the fly-wheel is revolving in either direction. The faces of the cam G' are eccentric as to the centre of the fly-wheel, and inclined outwardly from the latter, the curvature of the face being accommodated to the circle described by the point of the bell-crank K, against which the cam impinges with the revolution of the fly-wheel. The bell-crank K has a series of holes along its edge, to which the feed hands are adjustably attached, thus enabling the operator to regulate the feed, which operation is also assisted by the adjustable stop-plate Q, the point of which rests against the bell-crank, and regulates its motion away from the fly-wheel. Pins, P², are passed through the lugs upon the top of the feed hands, and project within the grooves cut on the outer faces of the ratchets O and O' for the purpose of holding the feed hands in their proper relation to the ratchets, the width of the groove being only sufficient to allow the proper action of the feed hands. A spring, K', presses the lower end of the bell-crank K away from the fly-wheel, thus bringing the point thereof again into its normal position as soon as the cam has passed.

What I claim as my invention, and desire to secure by Letters Patent, is—

1. The adjustable knife H, attached to the fly-wheel, in combination with the adjustable guide-plate G, attached to the frame, substantially as and for the purpose set forth.

2. The combination of the adjustable knife H and adjustable guide-plate G with the inclined plate A', substantially as and for the purpose set forth.

3. The eccentric notched cam N, in combination with the springs M, having projection M', substantially as and for the purpose set forth.

4. I claim the cam G', in combination with the fly-wheel G and bell-crank K, when respectively constructed and arranged substantially as set forth.

5. The mode of securing the feed hands in their relation to the ratchets by projections and grooves, substantially as and for the purpose set forth.

6. The devices for actuating and adjusting the feed hands by means of the adjustable cam G', bell-crank K, adjustable feed hands P and P, and adjustable plate Q, substantially as described.

In testimony whereof I have signed my name to this specification in the presence of two subscribing witnesses.

HARRISON OGBORN.

Witnesses:
D. P. HOLLOWAY,
CHAS. F. CLAUSEN.